Dec. 10, 1968   N. KONDUR, JR   3,415,477
READILY RELEASABLE SELF-LOCKING CLAMP
Filed June 23, 1967   2 Sheets-Sheet 1

INVENTOR.
NICHOLAS KONDUR JR.
BY
*James A. Perhow*
AGENT

INVENTOR.
NICHOLAS KONDUR JR.

United States Patent Office 3,415,477
Patented Dec. 10, 1968

3,415,477
READILY RELEASABLE SELF-LOCKING CLAMP
Nicholas Kondur, Jr., Northville, Mich., assignor to Burroughs Corporation, Detroit, Mich, a corporation of Michigan
Filed June 23, 1967, Ser. No. 648,382
10 Claims. (Cl. 248—225)

ABSTRACT OF THE DISCLOSURE

An apparatus for clamping a paper roll holder to a guide channel, the apparatus having a rail or slide member cooperating with the channel and a small-angled increasing radius cam forming a part of the rail, the cam being biased against one wall of the channel for providing a wedging action for preventing the sliding motion of the holder along the channel in one direction. An apparatus for clamping with two cams on a common pivot biased against opposite walls in the channel for increased frictional force for preventing motion in one direction. An apparatus for clamping with two cams placed in opposition and biased against opposite walls in the channel for preventing motion in either direction of the channel until released.

Background of the invention

This invention relates to improvements to a clamp for roll paper holders on printing business machines, and more particularly to a concealed clamp which does not require a tightening to hold in place and yet can be readily released.

On modern printing machines where a roll paper is provided on a moveable paper carriage, one of the problems in clamping a paper roll holder to the carriage lid is that the holder has to be clamped tight enough so that the roll will not fall off during machine operation, and yet, when the roll is exhausted, be loose enough so that an operator can release the holder easily. The conventional threaded wheel clamp, as shown and described in Patent No. 2,843,247 of Byron A. Runde, was found to be objectionable because the wheel would be screwed down tightly to avert accidental loosening during a machine operation. Releasing of the paper holder for replacement of the paper involved unscrewing the tightly bound clamp. As a consequence, rather than attempting to unscrew the clamp, the operator would tend to bend the tightly bound holder without releasing the clamp to permit insertion of a new journal roll, and would often crack or break the holder.

In prior art where a slide is clamped to a guide channel by friction, the clamp is on the outside of the channel. This is to permit access to the finger piece to which pressure is applied for releasing the clamp. This arrangement, however, would not permit its use with a bracket supported on the front face and guided by a channel formed behind the front face. The clamp would not be readily accessible for release.

Summary of the invention

It is, therefore, an object of this invention to provide a locking clamp for paper roll holders which does not require tightening of the clamp to prevent the holder from moving during machine operation.

A further object of the invention is to provide a locking clamp for paper roll holders which can be quickly released by an operator to replace or reposition the roll.

A still further object of the invention is to provide a locking clamp for paper roll holders which can be easily released by an operator to replace or reposition the roll, the locking clamp being concealed within the channel.

In accomplishing these and other objectives, applicant's invention comprises an easily released clamp for preventing the sliding of a bracket along a track. A central rail is slidably supported in a channel and a cam is mounted in the rail internal to the channel and fastened to the lower end of a shaft. The axis of the shaft is orthogonal to the longitudinal axis of the channel. A rotatable wheel is fastened to the top of the shaft and is located for easy access above the bracket. Biasing means urge the cam into the internal face of the channel. The cam lobe is shaped to engage the wall to force or wedge the flange member against the opposite internal wall of the channel in the manner of a frictional clamp. Any force against the lobe or short-angle of the cam will cause the clamp to wedge tighter in the channel.

One embodiment of the clamp prevents movement of the flange member and associated bracket in one direction only. This embodiment comprises a single cam attached to the release disc directly through the shaft. The cam is located between the rail members. By the application of slight rotational pressure to the disc, the clamp is released and the bracket is permitted to slide along the channel. The location of the disc above the base of the bracket permits easy access to release the clamp.

The second embodiment comprises two short-angled cams located in and made a part of the rail, the cams being pivoted on a common axis and contacting opposite walls of the channel. This embodiment provides extra force preventing the removal of the clamp in the direction against the angle of the cams. The rotation of the disc wheel turns the release cam which in turn pivots both short-angled cams out of contact with the channel. As in the first embodiment, movement of the bracket is prevented by the clamp in one direction only.

A third embodiment comprises two short-angled cams located between the rail members, said cams being spring biased each of contact opposite walls of the channel to prevent movement of the holder in either direction until released. The cams are pivoted on separate axes and are released by a release cam common to both short-angled cams. The cams are placed in opposition with the lobe or angle in position to wedge the rail in the channel. First one cam contacts the channel wall when movement is attempted in one direction and then the second in the opposite direction. The release cam is operated by a disc accessible from above the base of the bracket.

Brief description of the drawing

The novel features of the invention, as well as the invention itself, both as to its organization and method of operation, will best be understood from the following description when read in connection with the accompanying drawings in which.

Description of the preferred embodiments

Figure 1:
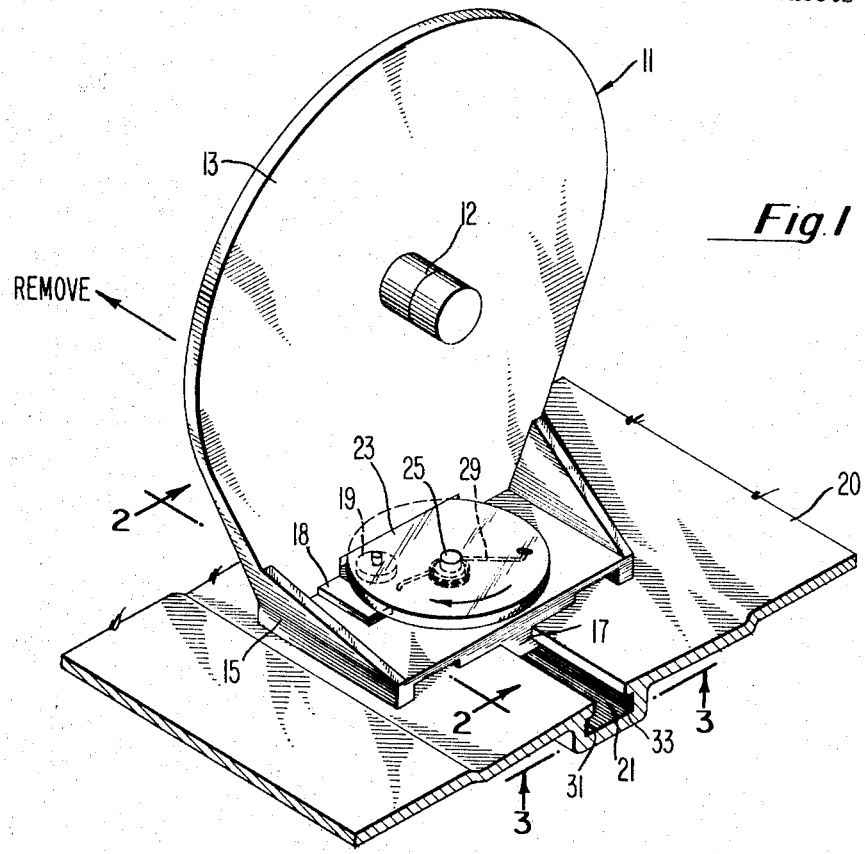
FIG. 1 is a perspective of one of the holders placed in a channel on the carriage cover.

The three embodiments of the invention are shown as applied to a paper roll holder of the type which by way of example, can be used on the carriage lid of an accounting machine of the kind shown in Patent No. 2,629,549 of Thomas M. Butler. The clamp along with a standard holds a supply of paper for use in compiling the records of business transactions. Referring to FIG. 1, one paper roll holder is shown generally at 11 being supported on the carriage lid of the accounting machine. The carriage lid 20 supports a similar holder on the other end of the lid. The holders are placed facing each other so that the paper roll is supported between the holders on the bushings 12. The holders 11 are placed on the carriage lid 20 by sliding rail 17 of the holder into the channel 21 formed into the carriage lid 20. Spring 29 urges the disc 23 and through shaft 25, the cam 27 against the side wall of the channel. The holder will slide on easily but putting force against the holder in the direction of the remove arrow will cause applicant's clamp to form a high frictional force which increases as the removal force increases.

More specifically in FIG. 1, the paper roll support comprises a standard 11 preferably formed of molded pastic having an upright plate portion 13 substantially flat except for a thickened reinforcing margin and a laterally inwardly extending foot portion or base 15 having on its lower face on extending inverted T rail 17 which extends into and cooperates with the inverted T channel 21 of the carriage lid 20 for slidably mounting the paper roll standard. The roll holder-standard 11 is slid onto the carriage lid 20 from one end so that the rails 17 are held in the channel 21. Movement is thereby only allowed along the channel. Stop 18 and emboss 19 prevent the spring 29 from relaxing completely and possibly falling out of the insets when the standard is not set in the channel. The top disc 23 is fastened to shaft 25 and is located in a plane parallel to the base. An opening is cut into the lower portion of the upright, see FIG. 2, to allow the disc 23 to protrude through the standard. The operator can then easily grip the disc while the paper is in place on the bushing 12. The disc 23 rotates the cam 27 through shaft 25. The cam is located between the two portions of the inverted T rail 17 and forms a part of the crossbar of the T. The cam in FIG. 3, which is the preferred embodiment, permits the standard to be placed onto the carriage lid without rotating the disc, since the lobe on the cam will merely slide when the holder is moved toward the paper roll. Pushing in the opposite direction to remove the standard causes the cam to grip the side wall. An increasing radius portion of the cam thereby becomes the point of contact and the force removing the holder tends to force the rail into frictional contact with the other wall.

Figure 3:
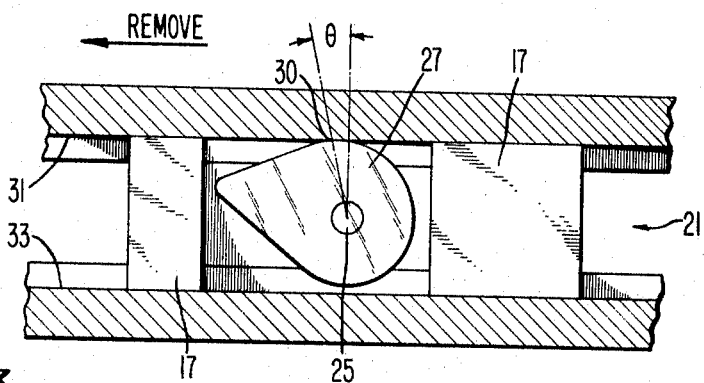
FIG. 3 is a vertical sectional view taken along lines 3—3 of FIG. 1 from beneath the channel and shows the principal embodiment of this invention.

The shape of one cam for use in this invention is shown in detail in FIG. 3. The operation of the wedging action can be readily seen. The REMOVE arrow shows the direction of the force which is tending to remove or separate the paper roll holders. The cam 27 is spring biased to contact the wall 31 at point 30. Attempting to slide the holder in the REMOVE direction will tend to rotate the cam. The clamping action is similar to that of a toggle. The center of the toggle is shaft 25 and the ends are contact points 30 and the rail pressing against wall 32. Putting force against the shaft 25 by a force against the entire holder, causes the ends of the toggle to be placed or wedged into high frictional contact with the walls of the channel, especially with respect to the rails against wall 33. Another explanation of the action is that the pivot point of the sliding holder becomes point 30 which is a point shifted from a line drawn perpendicular to the channel through shaft 25 by a short angle $\theta$. Applying force to the holder rocks the rail around pivot or contact point 30 into frictional contact with the opposite wall 33. A wedging action is formed putting a high frictional force between the rail 17 and the wall 33 of the channel thereby preventing movement of the holder. An increase in removal force results in an increase in the frictional force and thereby an increase in the clamping action. The increasing radius of the cam where it meets the wall 31 at point 30 may be serrated to improve the gripping action.

In using the holders with applicant's clamp, referring to FIG. 1, the roll paperholder-base rail is slipped into the inverted T channel 21 while holding disc 23 one-quarter turn clockwise from stop 18 to facilitate placement. The disc is released and spring 29 urges the cam into contact with the channel to clamp the holder 11 to the carriage lid 20 without further tightening of the disc.

In order to hold the paper, two holders are required on the carriage lid. The clamp in the preferred embodiment pemits movement of the holder towards the paper roll without loosening the clamps. Once the paper roll is inserted on the holders, the force of the paper held between the two standards provides a steady pressure to continue the wedging action. The cam clamp will then further resist any machine carriage movements tending to separate the standards. To release and remove the standard, disc 23 need be given only a quarter-turn clockwise to release the pressure angle cam and thereby allow removal of the entire holder.

Figure 2:
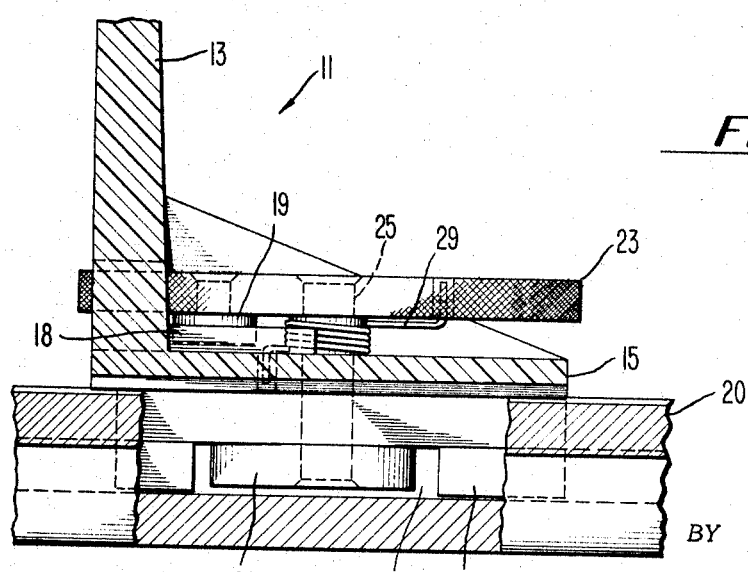
FIG. 2 is a horizontal sectional view taken along lines 2—2 of FIG. 1.

The action of the release disc 23 and the wedging cam 27 are shown in greater detail in FIG. 2. The disc protrudes through the upright 13 for ease of rotation. FIG. 2 also shows the cam 27 as a part of the rail 17 and forming a part of the cross-arm of the inverted T. Cam 27 is rotated by the disc 23 through the shaft 25. The cam is normally urged into contact with the channel wall by resilient means shown as coil spring 29.

Figure 4:
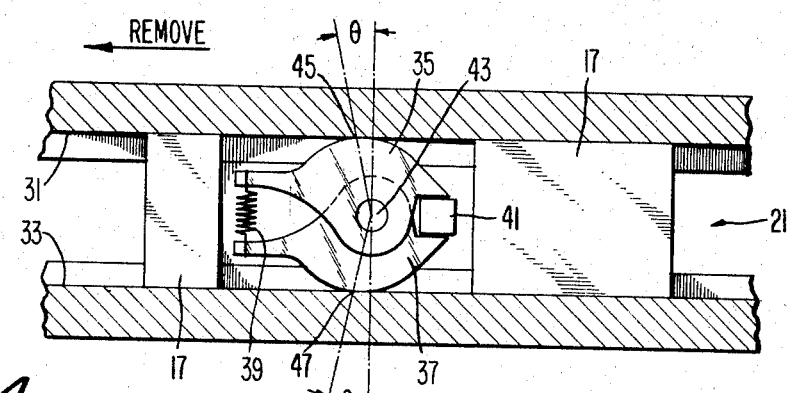
FIG. 4 is a vertical sectional view also taken along lines 3—3 of FIG. 1 and shows a second embodiment of this invention.

In FIG. 4, the second embodiment of the invention is shown. In this embodiment, the force against removal is supplied by each cam forcing against the other. As in the first embodiment, the article such as a paper roll holder is clamped within a channel. The clamping action operates in one direction only. In this figure, the clamping is obtained when force is applied in the direction of the REMOVE arrow. The article can be easily moved in the opposite direction since the cam which performs the clamping will not grip the walls of the channel but will merely slide slightly compressing the expansion spring 39. The cams 35 and 37 are mounted in the same position in the rail as the first embodiment, that is, as a part of the cross-bar of the inverted T rail. The release disc 23, FIGS. 1 and 2 pivots a release cam 41 and is not directly coupled to the wedging cams. The resilient pressure for urging the wedging cams 35 and 37 into contact with the channel walls is provided by an expansion spring such as shown at 39 and not by the coil spring on the disc. Revolving the release cam 41 one quarter turn through the disc will pivot the wedging or short-angle cam out of contact with the channel walls and thereby allows removal or repositioning of the holder in the channel in the direction of the REMOVE arrow. The disc need not be turned to move the holder in the other direction.

In operation of the clamping action of the second embodiment, referring to FIG. 4, the cams 35 and 37 have an increasing radius for the angle $\theta$, which is the angle between the perpendicular through the shaft pivot 43 and the contact or pivot points 45 and 47. Both contact points are on the same side of the perpendicular line. When force is applied to an article containing the clamp in the direction against the short angle of the cam such as the REMOVE arrow, cam 35 will grip wall 31 of the channel and pivot at point 45 and through the shaft pivot 43 tends to force the rail towards wall 33. Cam 37 at the same time pivots at point 47 tending to force the rail against wall 31 in opposition to the force from cam 35. The two cams working together thereby force against each other and provide a high wedging force to clamp the rail to the channel. The toggle action is easily seen in this embodiment. The center of the toggle is against the shaft 35 and the ends are contact joints 45 and 47 respectively. Revolving the release cam 41 a one quarter turn pivots the clamping cams out of contact with the channel walls. The rail is then moveable along the channel in either direction. The handle for rotating the release cam is located on the article outside of the channel and can be a serrated disc fastened to the other end of the release cam.

In the two embodiments applicant has provided a clamp which has fulfilled a need heretofore not shown nor anticipated by the prior art. No tightening is involved in clamping the article into position. The article may slide along the channel in one direction to position it without releasing the clamp and yet a force applied in the opposite direction will be opposed by the clamp. The clamp will be easily released even though the article is clamped within a channel. Applicant's cam clamp also has the advantage of increasing in clamping force as the force tending to remove the article increases. Realizing that a second cam could be added to his first embodiment in such a way as to prevent the motion of the article in either direction, applicant proposes a third embodiment.

Figure 5:
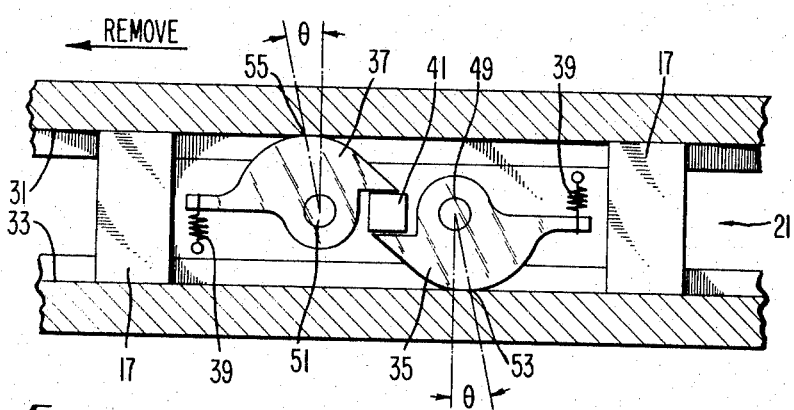
FIG. 5 is a vertical sectional view taken along lines 3—3 of FIG. 1 and shows the embodiment of this invention for preventing motion of the holder in either direction.

Referring to FIG. 5, the third embodiment comprises the two cams 35 and 37 placed on separate pivot points 49 and 51 respectively. This embodiment clamps against movement of the article along the channel in both directions. This is accomplished by placing the cams such that the increasing radius of each cam over the angle $\theta$ is on opposing sides of a line perpendicular to the direction of motion along the channel. The contact points 53 and 55 of the clamping or wedging cams contact walls 33 and 31 respectively. Separate coil spring 39—39 urge their respective wedge cam 35 and 37 into contact with opposite channel walls. As with the other embodiments, the cams are part of the rail 17 and form a part of the cross-bar of the inverted T rail.

The third embodiment can be applied to any article that requires clamping the article to the inside of the channel, the movement of the article to be prevented in either direction. In operation, when pressure is applied to the article such as the paper roll holder to the right as shown in FIG. 5 wedge cam 37 will slide and compress its associated spring. Cam 35, however, will wedge against wall 33 and form a pivot at point 53 which will force the rail into frictional contact with wall 31 and prevent the article from sliding. An attempt to move the article to the left will cause cam 35 to slide and compress its spring but cam 37 will wedge against wall 31 at point 55 and force the rail 17 into frictional contact with wall 33. The two wedge cams placed in opposition as shown in FIG. 5 rigidly clamp the article to the channel. In order to insert the rail part of the article into the channel and to position or reposition the article, the disc must be turned. The disc is fastened to the release cam 41 which pivots both wedge cams 35 and 37 around points 49 and 51 respectively, out of contact with the walls of the channel. The article is then free to move along the rail. Releasing the disc causes the springs 39—39 to again place the wedge cams in contact with the walls and the article is again clamped to the channel.

Applicant's clamping embodiments solved the problem of clamping an article to a concealed channel and yet provide means for easily releasing the clamp when desired. Another advantage is that the clamping is automatic upon release of the release disc. The springs urging the cam into contact with the channel walls provide the initial wedge which force increases as the force tending to move the article increases. Applicant shows his invention applied to a paper roll holder on an accounting machine. The application to an accounting machine should not be taken as limiting the use of the clamp and it is obvious that many other uses can be contemplated. It should be noted that the scope of the invention is limited only by the following claims.

What I claim is:

1. A clamp for a paper roll holder comprising
  a rail member to be connected to the holder,
  a guide channel having a pair of opposite side walls and receiving said rail therebetween, said channel being stationary relative to said rail member,
  wedging means carried by said member to engage one of said side walls and to urge said rail laterally to frictionally engage the other of said side walls when said rail is urged to move in one longitudinal direction along said channel,
  resilient means urging said wedging means in a direction to effect engagement of said wedging means with said channel wall, and
  manually operable means outside said channel to overcome said resilient means.

2. The clamp of claim 1 wherein the wedging means comprises a small-angled increasing radius cam.

3. The clamp of claim 1 wherein the wedging means comprises two small-angled increasing radius cams placed in opposition engaging opposite walls of the channel.

4. A concealed releasable clamp for preventing linear motion of an article on a larger substantially plane supporting surface comprising
  a base on said article formed to contact the plane surface,
  a slide-rail member forming a part of said base and projecting therebelow, said slide member having a cut-out portion centrally located between the ends of the member,
  a pair of opposite walls of a guideway, formed in the plane surface for receiving said slide member therebetween,
  a shaft journalled to said base with its lower end projecting into the cut-out portion of the slide member and its upper end extending above said base,
  wedging means located in the cut-out portion of the slide member and fastened to said shaft, said wedging means being operable for engaging one of said side walls to urge the slide member laterally in said guideway to frictionally engage the other of said side walls when the article is urged to move in one longitudinal direction along the guideway.
  resilient means biasing said wedging means in a direction to effect engagement of the wedging means with said one side wall,
  a disc fastened to the shaft above said base operable to rotate the shaft in the direction to overcome said resilient means and thereby release the article for movement along the guideway.

5. The clamp of claim 4 wherein the wedging means comprises a small-angled increasing radius cam.

6. A clamp for preventing the sliding motion of an article along a guideway in one direction, said article having a member for slidably fitting the guideway between the side walls thereof and including
  wedging means forming a part of said member for engaging the side of one wall of the guideway and thereby urge the member laterally in said guideway to frictionally engage the other side wall of the guideway when said member is urged to move in one longitudinal direction along the guideway,
  resilient means urging said wedging means in a direction to effect clamping of said member to the guideway, and
  manually operable means carried by the member and operable to overcome said resilient means and thereby release the clamping action of said wedging means.

7. The clamp of claim 6 wherein the wedging means comprises a small-angled increasing radius cam.

8. A concealed clamp for locking a paper roll holder on a larger substantially plane surface comprising
  a base on the paper roll holder formed to contact the plane surface,
  a slide member forming a part of said base and projecting therebelow, said slide member having a cut-out portion centrally located between the longitudinal ends of the member,
  a pair of opposite side walls of a guideway formed in the plane surface for receiving said slide member therebetween, a wedging element located in the cut-out portion of the slide member and rotatably fastened to said base for engaging one of said side walls to urge the slide member laterally in said guideway to frictionally engage the other of said side walls when the holder is urged to move in one longitudinal direction along said guideway, resilient means biasing said wedging element in a direction to effect engagement of the element with said one side wall, a shaft journalled in said base with its lower end projecting into the cut-out portion of the slide member and operable to effect rotation of the wedging element away from engagement with said side walls in a direction to overcome said resilient means, and means fastened to the upper end of said shaft for effecting rotation thereof.

9. The clamp of claim 8 wherein the wedging means comprises a small-angled increasing radius cam.

10. The clamp of claim 8 wherein the wedging means comprises two small-angled increasing radius cams placed in opposition for engaging the opposite side walls of the guideway.

References Cited

UNITED STATES PATENTS

| 2,843,247 | 7/1958 | Runde | 197—133 |
| 3,015,897 | 1/1962 | Hopp | 248—226 XR |
| 3,138,262 | 6/1964 | Anders | 211—162 XR |
| 3,142,384 | 7/1964 | Fridolph | 211—43 |
| 3,282,519 | 11/1966 | Rheinstrom | 248—225 XR |

JOHN PETO, *Primary Examiner.*

U.S. Cl. X.R.

248—226, 245; 211—162

UNITED STATES PATENT OFFICE
CERTIFICATE OF CORRECTION

Patent No. 3,415,477                                          December 10, 196

Nicholas Kondur, Jr.

It is certified that error appears in the above identified patent and that said Letters Patent are hereby corrected as shown below:

Column 7, line 18, beginning with "9. The clamp" cancel all to and including "guideway." in column 8, line 4, and insert:

9. The clamp of claim 8 wherein the wedging element comprises a small-angled increasing radius cam.

10. The clamp of claim 8 wherein the wedging element comprises two small-angled increasing readius cams placed in opposition for engaging the opposite sides of the guideway.

Signed and sealed this 10th day of March 1970.

(SEAL)
Attest:

EDWARD M.FLETCHER,JR.                              WILLIAM E. SCHUYLER, JR
Attesting Officer                                         Commissioner of Patents